May 22, 1956 F. SCHULTE 2,747,115
VARIABLE RATIO TRANSMISSION
RESPONSIVE TO SPEED OF LOAD
Filed March 17, 1953 2 Sheets-Sheet 1

INVENTOR
Fritz Schulte
BY
Frank H. Borden
ATTORNEY

United States Patent Office 2,747,115
Patented May 22, 1956

2,747,115

VARIABLE RATIO TRANSMISSION RESPONSIVE TO SPEED OF LOAD

Fritz Schulte, Philadelphia, Pa., assignor to Thomas D. Bowes, Bala-Cynwyd, Pa.

Application March 17, 1953, Serial No. 342,847

15 Claims. (Cl. 310—102)

This invention relates to transmission systems with changeable ratios, automatically secured as functions of signals from a driven load.

While the invention finds an excellent usefulness in the case of automotive devices, such as in automobiles, trucks, diesel locomotives, vessels, tug boats, and other forms of ships, in aircraft and the like, it is not essentially limited thereto and is also available and is contemplated for use in any organization as the driving connection between any power unit and any load, such as those associated with, or incorporated in, machinery, tools, rolling mills, and the like. For simplicity the invention will be described in its particular relation to automotive vehicles, in which a prime mover power plant, such as an internal combustion engine at one end (input) of the transmission line, furnishes power for a load, such as a driven axle or propeller at the other end (output) of the transmission line.

In the application of Thomas D. Bowes, filed November 5, 1952, under Serial No. 318,945, entitled "Automotive Transmission System with Changeable Ratios," now matured into Patent 2,732,508, dated January 24, 1956, there was disclosed a transmission system automatically responsive to load or torque requirements from the power plant, for changing ratios of input to output, of the transmission. For an example of an illustrative form of transmission reference was made therein, and will be made herein, to the application of Thomas D. Bowes, Serial No. 318,944, filed November 5, 1952, entitled "Variable Ratio Dynamoelectric Transmission," now matured into Patent 2,715,689 granted August 16, 1955, relating to an electrodynamic drive system as a modification of Bowes Patent No. 2,465,006, granted March 22, 1949.

It is among the objects of this invention to provide a transmission of variable ratio of input to output, responsive to signals from the driven load; to provide an automatically shifting variable ratio transmission, in which the attainment of a condition of "rest" of the load effects automatic establishment of the highest ratio, i. e. the lowest "gear," from which upshifting toward and to the lowest ratio, i. e. the highest "gear," of effectively 1:1 ratio, utilizing a dynamoelectric transmission; to utilize the electric transmission of the said Bowes application, Serial No. 318,945, filed November 5, 1952, entitled "Automotive Transmission System with Changeable Ratios" with a coordinated control system for effecting automatic ratio selection in response to signals from the driven load; to provide an automatically shiftable variable ratio transmission in which the momentum or speed of the driven load is caused to generate a dynamic force operable against a mechanical bias force, with the selected ratio determined by the instantaneous balance between these opposing forces; to provide an automatic transmission of variable ratio in which the momentum or speed of the driven load generates a dynamic force in a system including a movable switching device biased in one sense by a mechanical bias force opposed by the dynamic force, with instantaneous unbalance in one sense or the other causing the automatic upshifting or downshifting of the variable ratio transmission, to a ratio of input to output determined by the instantaneous balancing of the opposing forces; to provide an automatically shifting transmission responsive to the momentum or speed of the driven load and independent of the load on the prime mover; to provide an automatically variable transmission in which, at any time, a manual control can be superposed on the automatic shifting functions, to establish a proper ratio for a rapid acceleration, as, for instance, when the transmission is in an automotive device, by pressing the accelerator pedal beyond a certain point, for such rapid acceleration, preferably, operable only when the vehicle is operating at moderate speed; to provide a dynamoelectric transmission having a reverse operable when set, to develop dynamic braking, for an automotive or other load; and to provide other objects and advantages as will appear as the description proceeds.

In the accompanying drawings forming part of this description.

Figure 1:
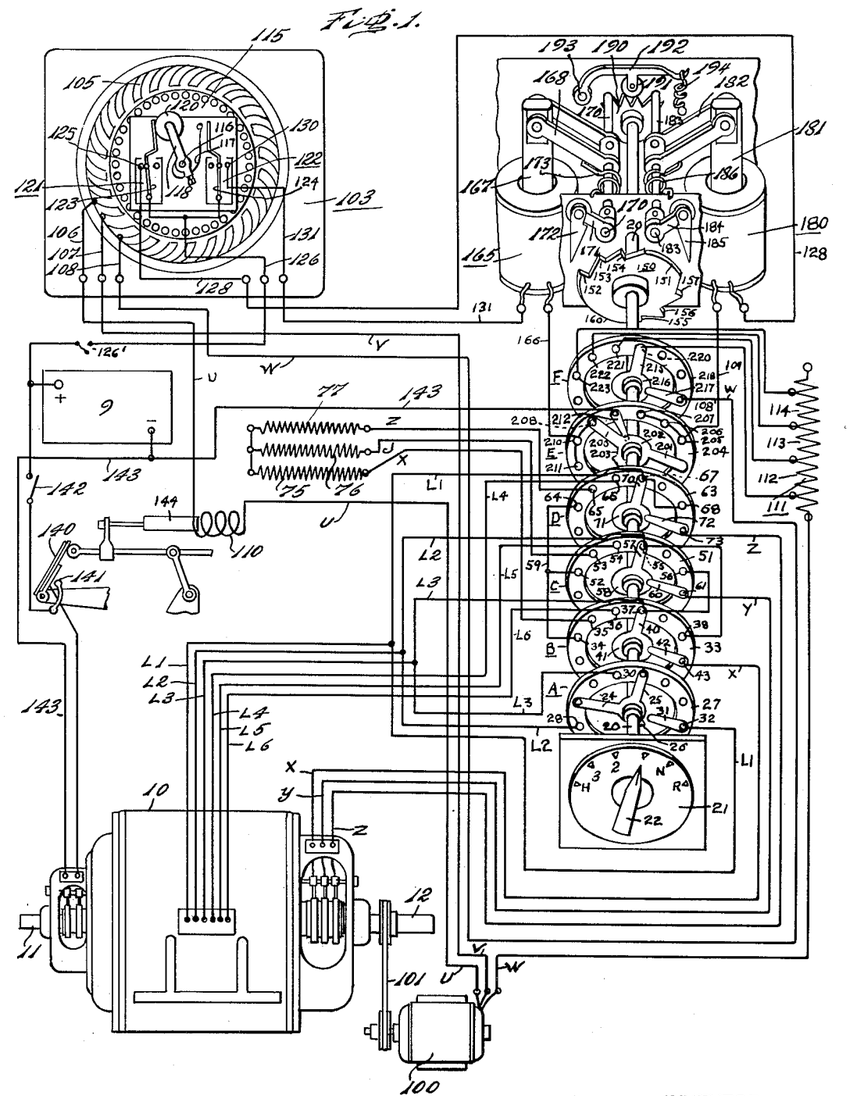
Fig. 1 represents a diagram of the transmission device according to this invention in which the main selector switches are relatively heavy and directly carry the load of the currents and are operated to effect the automatic shifting of the ratios of the illustrative dynamoelectric drive.
Figure 2:
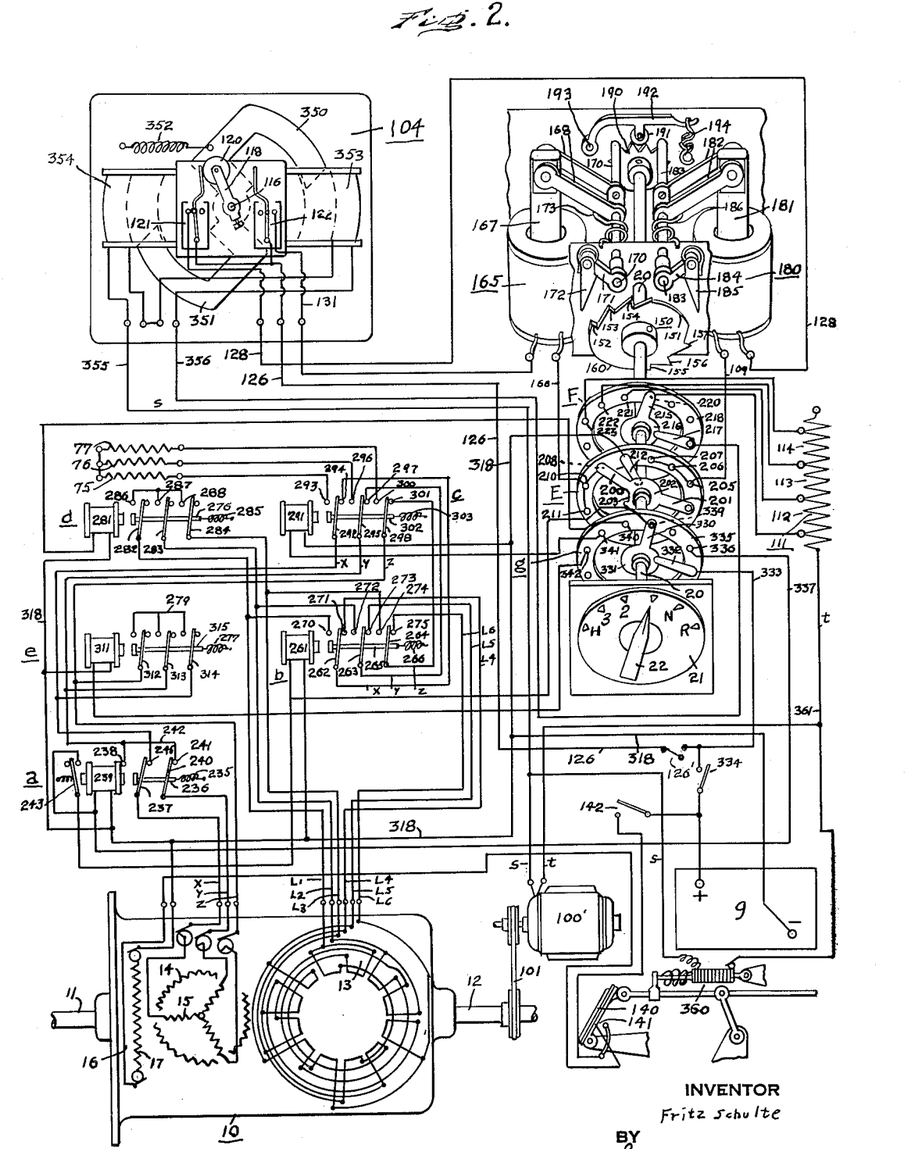
Fig. 2 represents a diagram of the system of Fig. 1 modified to utilize auxiliary relays or main contactors, from smaller directly-operated selector switch parts.

Referring now to Figs. 1 and 2, the purely illustrative form of transmission comprises a housing 10, provided for suitable anchorage in the transmission line, between the undisclosed prime mover and the undisclosed load. The housing 10 of the transmission mounts an input or driving shaft 11 having an external portion for coupling to a power source, such, for instance, as an internal combustion engine. The transmission housing 10 also mounts a driven or output shaft 12, having an external portion for coupling to the load, such, for purely illustrative example, as the rear axle of the vehicle. As noted, the power source may be anything desired, such as any form of internal combustion engine or a steam turbine, or any other power source, and the load may be anything it is necessary or desired to drive through rotations of the shaft 12, such as machinery, pumps, rolling mills, propellers, or the driving axle of automotive vehicles.

The variable ratio transmission found by housing 10 and its contained parts to be described, is the same in both figures, but in Fig. 2 the components are schematically or diagrammatically disclosed, while for simplicity omitted from Fig. 1.

Fixed within the housing 10 is the stator 13 of the motor part of the transmission, which has illustratively a plural speed compound winding, and for illustrative purposes is such as to have two speed ratios determined by the relative numbers of poles of the windings, with input connections respectively for both sets of pole organizations. For example, the stator 13 may be wound for four or eight poles in the torque converter functioning of the transmission, to be described. These pole organizations may comprise any other related numbers of poles, such as six and twelve poles, respectively, ten and twenty poles, respectively, etc. The generator poles of the generator parts to be described may be two in number, or may be more than two, as, for example, four in number, the only presently understood restriction being that the numbers of motor poles in both or all motor pole organizations should be a multiple of the number of generator poles. The pole organization may comprise separate sets of windings. The input leads for the illustrative eight pole organization are identified herein as L1, L2, and L3, while the input leads for the four pole motor organization are identified as L4, L5 and L6.

Attached to the driven or output shaft 12 is an armature, illustratively comprising a squirrel cage rotor 14, externally confronting the stator 13 and forming therewith a motor. By suitable wiring, such as additional slip ring leads or the like, the organization of the motor parts can be reversed, with a squirrel cage as the fixed external member, but this is not preferred.

The driven shaft 12, internally of and on the squirrel cage rotor 14 also mounts a rotatable generator armature 15, having three slip ring output leads, respectively $x$, $y$ and $z$, for the respective three phases of output from a polyphase generator, of which the armature 15 is a generator part. The rotatable generator armature 15 internally confronts the high speed rotor 16 mounted on and driven by input shaft 11 of the system forming a complemental generator part. Rotor 16, with whatever number of salient or other poles it may have, say, the illustrative two poles, preferably has an exciting winding 17, energized through slip rings with D. C. current from any suitable source, such, for instance, by a battery 9. The rotor 16 may be self-exciting, if desired, or may comprise permanent magnets, but the separate excitation 17 has control advantages and is presently preferred.

The transmission unit as thus far described constitutes a modification of the Bowes Patent No. 2,465,006, granted March 22, 1949, and is disclosed and developed in said application Ser. No. 318,944, filed by Thomas D. Bowes, on November 5, 1952.

The illustrative controlling unit of the system, for convenience, provides an oscillatable shaft 20, controlling switches in the organization, suitably journalled for oscillation with reference to a dial 21, bearing calibrations or indicia by which the instantaneous shaft setting and thus the instantaneous ratio setting of the transmission effected by switches, to be described, can be ascertained. The dial is illustratively graduated with indicia such as "H," "3," "2," "1," "N," and "R." A combined pointer and control knob 22 is mounted on shaft 20 in front of dial 21. For convenience, the setting of shaft 20 and knob 22 is manual for "R," "N," from "N" to "1," and is automatic from "1" to "H" and from "H" to "1," according to the direction of switching. In the position shown, the knob 22 registers with and conceals "1." A series of switching members are mounted on the shaft for oscillation therewith relative to fixed insulating rings surrounding same, bearing contact terminals for selective contact making engagement by movable switch elements to be described. This is broadly true of the controllers of both figures, but the specific organization of the controller of Fig. 1 will first be described.

Referring, then, to Fig. 1, the circuit controllers or switches illustratively are six in number, of which the first four are heavy duty switches, A, B, C, and D, and the other two are comparatively light auxiliary switches E and F. Switch A comprises a movable portion including two divergent arms 24 and 25 and a partial inner sector 26. The arms and sector are insulatedly mounted on shaft 20. The insulating ring member 27 of switch A mounts contacts 28 and 30, disposed to be engaged by the respective arms 24 and 25 when the shaft 20 is in that position at which knob or pointer 22 is in register with indicia "2," but to be out of contact therewith at all other shaft settings. A fixed wiper arm 31 is mounted on the ring 27, extending from a terminal 32, to wipe and establish contact with the partial sector 26 in said stated position "2" of the knob 22 and shaft 20 and no other. Terminal 28 connects to L2, contact 30 connects to L3, and wiping arm terminal 32 connects to L1. In position "2," switch A short circuits motor contacts L1, L2, and L3.

Switch B comprises a fixed ring member 33, mounting contacts 34, 36, 36, 37, and 38, and the movable portion comprises a single wiping arm 40 and integral wiping ring 41, insulatedly mounted on shaft 20. Ring 41 is constantly wiped and electrically engaged by the stationary wiping arm 42, from terminal 43 on the ring 33, connected to generator output lead $x$. It will be seen that in the shaft and knob position illustrated ("1") a switch arm 40 engages contact 37 (connected to L3) and alternatively engages contact 38 at "R" setting, contact 36 (connected to L6) at "2," contact 35 at "3," and contacts 34 at "H." Wiping arm 42 supplies phased generator output $x$ to switch arm 40 for supplying this output successively or alternatively to the various recited output contacts of the switch as the shaft is shifted in angularity, for purposes to be discussed.

The third circuit controller C comprises the stationary insulating ring 51, mounting the contacts 52, 53, 54, 55 and 56, for selective engagement by the single movable arm element 57, insulatedly mounted on the shaft 20, and carrying the integral inner wiping ring 58, in constant contact with the stationary wiping arm 60 from terminal 61 on ring 51. The latter terminal is connected with the phase output $y$ from the generator and supplies this phase output to the various contacts of switch C as the shaft is angularly shifted, for purposes to be described.

The fourth circuit controller D comprises the stationary ring portion 63, which mounts the contacts 64, 65, 66, 67, and 68, successively engaged by the single arm 70, insulatedly mounted on shaft 20, and having the inner wiping ring 71 for wiping arm 72 from terminal 73 on ring 63, and the latter terminal is connected to the phase output $z$, to supply this phase of the generator output to the output contacts of switch D.

Of the contacts on the three last mentioned circuit controllers, 34, of switch B, 52 of switch C, and 64, of switch D, are connected together through a common connector 59, whereby in selector position "H," the generator outputs $x$, $y$ and $z$ are short circuited in high "gear." Contacts 35, 53, and 65 respectively of switches B, C, and D. are connected to resistances 75, 76, and 77 to connect the generator outputs $x$, $y$ and $z$ respectively to the respective resistances in selector position "3," or third "gear." Contact 36 of switch B connects with L6, 54 of switch C connects with L5, and 66 of switch D connects with L4 to connect the respective generator outputs $x$, $y$, and $z$ to the four pole motor leads L6, L5 and L4 respectively in selector position "2." Contact 37 of switch B connects both with L3 and with terminal 56 of switch C. Contact 55 of switch C connects with L2 and with contact 38 of switch B, and contact 67 of switch D connects with L1 and also with terminal 68 of switch D, for reversing the connections of generator leads $x$ and $y$ to the eight pole motor leads from the connection thereof in illustrated position "1," for reversing the transmission in selector position "R."

The organization as thus far described with its functioning is disclosed in and covered by Bowes application Ser. No. 318,945. This application differs therefrom in certain regards, including the provision of automatic means and a system for positioning the shaft 20 to certain at least of its various angular settings, as a function of signals from the load functional with speed, momentum, or acceleration thereof.

The output shaft 12 of the transmission, driven at a predetermined selected ratio, by the power on the input shaft 11, and being coupled to the driven load, rotates as a function of the effects of applied load, i. e. as a function of momentum or M. P. H. previously imparted to the vehicle or load from the power plant and/or by gravity. As a simple means for generating signals functional with the momentum or load speed, a small generator, such as a three phase generator 100 is provided in Fig.

1, driven by the shaft 12, or by any other rotatable load element, such, for instance, as the rear axle of an automotive vehicle, or the propeller shaft of a vessel. It is more convenient to have the generator 100 driven directly by the output or driven shaft 12, as by the belt and pulley organization 101 than from other driven elements. The generator 100 has three phase outputs respectively $u$, $v$, and $w$, but this is illustrative, and, as shown in Fig. 2 and later described, this generator might comprise a single phase A. C. generator 100'. As generator 100 or 100' is small, the rotor thereof, driven by the output shaft 12, may comprise permanent magnets. The voltage output is a function of its speed, and generates a dynamic force of corresponding ratio. This dynamic force is used herein to initiate and control the positions of the shaft 20.

In order to secure control circuit actions for automatically changing the angular settings of shaft 20, by stepping means to be described, it is desirable to provide a pilot relay 103, as shown in Fig. 1, or 104 as shown in Fig. 2, in which the varying dynamic force from the small generator 100 is opposed by a mechanical force in the pilot relay.

The details of this pilot relay are set forth in application of Fred Schulte, Ser. No. 299,435, filed July 17, 1952, now matured into Patent 2,636,095 granted April 21, 1953, to which reference may be made for the theory and illustrative practice of the relay. It is essential for automotive purposes at least that the pilot relay be immune to accelerative forces and vibrations and this is a feature of the relay described in said Schulte application.

The pilot relay used with the invention is, for purely illustrative instance, shown in two forms, although either form may be used with either form of the instant invention, or, indeed, any other form of pilot relay can be used by which the control functions desired can be achieved. In both forms of pilot relay shown, namely 103 in Fig. 1, and 104 of Fig. 2, an armature is mounted to respond to voltages in a complemental field for the development of dynamic force in one direction, illustratively clockwise of both figures. The armatures, to be separately described, are mounted on a shaft 116, biased counterclockwise by a suitable spring 117, preferably of adjustable pre-loading, toward a limit stop (not shown). The shaft 116 mounts an arm 118, movable in a plane parallel to the median plane of the armature normal to the shaft 116. Arm 118 mounts a switch-actuating roller 120, having a limited path of arcuate bodily motion, between a downswitching switch 121 and an upswitching switch 122. At the anti-clockwise limit of translation of the roller 120, switch 121 is made so that a momentary D. C. impulse passes through the downswitching solenoid, to be described. At the clockwise limit of bodily translation of roller 120, upswitching switch 122 is actuated to "make," so that a momentary D. C. impulse passes through the upswitching solenoid to be described.

Switches 121 and 122, which may, if desired, be simple microswitches of the single pole type, for illustrative purposes, comprise respectively contact carrying resilient arms 123 and 124, of such length and disposition as to be in the path of movement of roller 120 toward said respective limits.

The respective switch arms 123 and 124 are connected to a common lead 126. The single contact 125 of downswitching switch 121 connects with a lead 128. The single contact 130 of upswitching switch 122 connects with a lead 131.

In the form of the relay 103 shown in Fig. 1, the shaft 116 mounts a squirrel cage rotor armature 115 positioned in a three phase field winding 105 having three input leads, respectively 106, 107, and 108. The relay field 105 is supplied by the small generator 100, of which lead $v$ connects directly to input lead 107, whereas the generator output leads $u$ and $w$ are through voltage modifying connections to vary the effectiveness of the field on the armature for desired control functions. Illustratively, lead $u$ passes through choke coil 110 in connecting with field input lead 106. Generator output lead $w$ connects with one end of the compound series resistor 111, having the series aligned sections 112, 113 and 114, controlled through the various contacts of the auxiliary switch F to be described, so that selectively varying values of resistance can be cut into the generator output lead $w$ and supplied to the field input lead 108.

A manual control 140, illustratively a foot throttle or the like, when used in automotive devices, is provided, which in the idling position, with pressure released, leaves open a switch 141 controlling the excitation of the exciting field 17 of the rotor of the generator parts of the transmission. The D. C. current flow to this exciting winding 17 is from one pole of battery 9, across manual switch 142, across switch 141, when closed by slight pressure on the foot lever 140, through the rotor exciting winding 17, and by lead 143 to the other pole of the battery 9. The foot throttle lever 140, through suitable linkage also controls the movement of the core element 144, of the choke coil 110 of Fig. 1, to modify the voltage of the small generator lead $u$ entering relay field lead 106 when rapid acceleration of the vehicle is sought, when traveling at a moderate speed.

In order to control the upshifting and downshifting progression of the steps of ratio change, the shaft 20 mounts a special form of cam, responsive to stepping mechanism comprising solenoid-actuated pawls. To this end a cam ratchet element 150 is mounted rigidly on the shaft 20, and is provided with an upper arcuate surface 151 dividing the periphery of the cam element into an up-shifting series of upwardly presenting teeth, respectively 152, 153, and 154, which, in the position of the parts shown, are for progressing the shaft from the instant low or first "gear" setting, successively into second, third, and high. The cam ratchet element 150, on the opposite side of the arcuate surface 151, is provided with a down-shifting series of upwardly presenting teeth, respectively 155, 156, and 157. These latter, respectively, are operative when the shaft has been moved to an angular position with the pointer knob at "H," for successive engagement to downshift from "H" to third, second, and, finally, to low or first. As will be apparent later, respective upshift or downshift actuations can occur from any intermediate shaft setting. The lower surface of the cam element is completed by a generally arcuate surface 160 between the lowermost upshift tooth 152 and the lowermost downshift tooth 155.

An upswitching solenoid coil 165 is suitably fixedly mounted, having a D. C. input lead joined to the pilot relay lead 131 from upswitching switch 122 thereof, and having the other current lead 166 for connection to auxiliary switch E, to be described. A core or armature 167 is movable in the downswitching solenoid coil 165, and through pivoted arms 168 incorporating a suitable floating lost motion, rocks a pawl shaft 170, suitably journalled on the organization. The pawl shaft 170 mounts a crank arm 171 on which is pivoted a toothed pawl or dog 172, biased lightly toward the cam ratchet 150. The pawl shaft 170 is suitably biased, as by spring 173 as to urge the core 167 out of the solenoid coil 165. Energization of the solenoid coil 165 draws in the core and by pawl 172 engages one juxtaposed tooth of the cam element teeth 152, 153 or 154, and advances it one step in the upshifting direction. In the position shown, the pawl 172 would engage tooth 152.

A second, downswitching, solenoid coil 180 is provided, having a D. C. input lead connected to the pilot relay lead 128 of the downswitching switch 121, and a return lead 109 passing to a contact of auxiliary switch E, to be described. A core or armature 181 is provided for coil 180, pivoted with suitable floating lost motion on arms 182, fast on a second pawl shaft 183, mounting crank 184 carrying the pivotally mounted lightly biased pawl or dog 185. The second pawl shaft 183 is suitably biased, as by spring 186, to urge the core out of the solenoid. Energization of solenoid coil 180 draws in the core 181 and by pawl 185 engages one juxtaposed tooth of the respective teeth 155, 156, or 157 of the cam element 150 and advances it one step in the downshifting direction. In the position shown, however, as the automatic downshift has been completed and no further advance in that sense is desired, the actuation of the coil 180 would simply force the pawl 185 against the arcuate surface 151, swinging the pawl on its pivot on crank 184, without any effect on the cam element.

Suitable indexing is provided to hold the shaft in each adjusted position. Illustratively, this comprises a star wheel 190 mounted on the shaft 20, and a roller 191, mounted on a lever 192, having a pivot 193 eccentric to the shaft 20, and biased against the star wheel by a spring 194. Any other suitable indexing arrangements may be used.

To complete the system according to Fig. 1, the shaft 20 controls the setting of auxiliary switches E and F. Switch E comprises a movable switch element comprising two angularly divergent integral switch arms 200 and 201 having a wiping sector 202 possessed of an arcuate cut-out portion forming a recess 203, insulatedly mounted on rock shaft 20. A wiping arm 212 is provided engaging sector 202 in all positions except in shaft position "R" at which wiping arm 212 enters arcuate recess 203. Contact arms 200 and 201 wipe the face of the insulated ring 204, and in the position shown (in angular shaft-setting equivalent to low or 1st "gear"), arm 201 is on a blank on the ring as it has no downswitching functions at this point. However, as the shaft 20 progresses in upshifting, contact arm 201 successively engages contacts 205, 206, and 207, all connected together and to lead 109 for the downshifting solenoid coil 180. As upshifting is the only angular change possible at the position shown, the switch arm 200 is on a contact 208, and successively engages contacts 210 and 211, in complete upswitching. These three contacts are all connected together and by lead 166 to the upswitching solenoid coil 165. In order to furnish the D. C. input for the respective solenoids, to be completed through switch E, the wiping arm 212 is provided bearing against the sector 202 and connected to battery-connected lead 143. To simplify the disclosure, the wiping arm is shown off-set from its position under the sector. It should be adequate to understand the disclosure to note that the wiping arm 212 energizes the movable switch elements at all positions thereof, except when the shaft has been moved to "N" or "neutral," at which setting the switch arm 220 overlaps wiping arm 212, and at "R" or "reverse," at which setting the wiping arm registers with the cut-out recess 203 and breaks contact with the movable portion of the switch E. It will be seen that the function of the auxiliary switch E is simply to permit the solenoid operations, except "N" and "R," which operations in turn control the settings of the shaft 20 and the switches associated therewith, and also serve as a limit switch at "H" and "1."

It will be seen that auxiliary switch E carries small currents and can be relatively small and light as contrasted with the switches A, B, C, and D. The same remarks attach to switch F.

Auxiliary switch F comprises a single movable arm 215 and wiping area 216, and the latter is constantly engaged by a stationary wiping arm 217 connected to the pilot relay lead 103. The insulating ring 218 of switch F mounts contacts respectively as follows: 220, connected to the lowest end of resistor section 112 of resistor 111, 221, connected to the upper end of resistor section 112, 222 connected to the upper end of resistor section 113, and 223 connected to the upper end of resistor section 114. It will be seen, therefore, that small generator output lead w has a minimum resistance in its line in the position of the parts shown, wherein the contact arm 215 engages contact 220 to complete the circuit of w to the lead 103 of the field of the pilot relay, and that with successive upshifting more and more resistance is cut into the line of the small generator output lead w, with a consequent increasing modification of the effectiveness of the total small generator output on the pilot relay.

As has been explained in both of said Bowes applications, the transmission has illustratively four forward speeds or ratios. As there is no mechanical coupling between the generator parts and the motor parts, except that the output shaft mounts one part of each system, there is always a certain amount of slip in the transmission which minimizes shock, etc. In brief, the organization has a low speed highest ratio of input to output when the transmission generator output x, y, and z is fed into the illustrative eight pole organization of the motor, to wit, leads L1, L2, and L3. This is the connection accomplished by the selector device in the "1" setting of the selector shaft; with a reversal of leads x and y, this is the connection established by position "R." By switching the generator output leads to the illustrative four pole motor organization, in the forward drive only, to wit, to motor leads L4, L5, and L6, and shorting out the eight pole leads L1, L2 and L3, the speed of the output shaft 12 is doubled while the torque is cut in half. This is accomplished by the shift of the selector shaft 20 to a position identified by "2" on the dial 21. In both of these transmission organizations the transmission functions as a torque converter in which the motor plays a part. In switching to shaft position "3," the generator output leads x, y and z are disconnected from all motor leads, and are connected with the respective resistors 75, 76, and 77. With this arrangement, the motor parts are cut-out and the transmission functions as a magnetic slip clutch, with appreciable slip owing to the resistors in the generator leads, to effect a transmission ratio in which, while the load never reaches full speed, the transition of the normal torque of the power source, or of vastly greater than normal torque, if such is available from the power source, is facilitated, with increased speed, but with predetermined slippage as a function of the input resistances. When the selector is changed to "H," or fourth "gear," the generator output leads x, y and z are directly short-circuited. This establishes the transmission as a magnetic clutch having some slip, but not as much as in the third ratio, and in effect is the lowest ratio, substantially 1:1 drive. As pointed out in said Bowes application, Ser. No. 318,945, the resistances 75, 76, and 77 placed in the generator output lines x, y, and z at step "3" may desirably be removed more or less gradually, which can easily be effected by slight changes in the wiring and switching systems, as by removing the resistances in plural steps instead of one step. By suitable resistance tap connections and intermediate contacts on the selector device in switching from "3" to "H" the generator leads may be successively shifted from full resistance to that portion of the resistance determined by the tap locations preliminary to the actual switching into "H." This makes the transition of the torque smoother.

In operation of the system shown in Fig. 1, it will be understood that the pilot relay is exposed to a varying dynamic force functional with the speed of rotation of the small generator as instantaneously modified by the choke coil 110 and by the sections of resistor 111, and this is preferably an A. C. voltage effect. The switches of the pilot relay control D. C. circuits for operation of the solenoid stepping selector device determining the ratios of the transmission.

Let it be assumed that the selector switch device is manually turned to "N." At this point no voltages flow in the system, thus enabling the power plant or motor to be started and tested without any actuation of the transmission. Let it be assumed also that the illustrative disclosure is in an automotive device. It is to be understood that the output of the small generator is a function of the momentum or speed in M. P. H. imparted to the load, typified by the output shaft 12. This momentum or speed is a result of all forces acting on the vehicle, comprising the power input from the motor and the force of gravity, either as a positive or a negative force, as modified by any other factors such as the weight of the actual load, etc. It is contemplated that the small generator 100 generates or develops in the pilot relay a dynamic force of increasing ratio to initiate the upshift or downshift of the selector device as a step-by-step progression whenever the variable and increasing or decreasing dynamic force is able or is unable to overcome the counterbalancing force represented by the spring 117. In other words, the increase of dynamic force creates or establishes a condition for upshifting, whereas a decrease thereof creates or establishes a condition for downshifting. The upshifting and downshifting do not necessarily occur at the same identical relative M. P. H. incident on the small generator 100, because, as will be explained, the upswitching is affected by the operations of the driver relative to the actuations of the foot throttle 140. It is important to note of the instant invention that the shifting between ratios in either sense is not dependent upon the load on the power plant, but only on the resultant speed of driven load and throttle opening.

While, if desired, the excitation of the rotor 16 may be accomplished by manual control, it is preferred, especially in the automotive form of the invention, to permit the final closing of the excitation circuit to depend upon slight throttle control opening movement and release of the throttle to idling interrupts the excitation thus preventing creep at traffic lights and such as well as permitting free-wheeling in motion. The ratio selector having been arbitrarily set at low "gear" or "1," the phased output of the generator parts of the drive or transmission are coupled to the illustrative eight pole organization of the motor parts of the drive, effecting the highest ratio of input to output of the drive, functioning as a torque converter in the lowest "gear." With the vehicle stationary, generator 100 has no output and roller 129 has closed switch 121, in the static rest condition of the pilot relay. As the motor speeds up with opening of the foot throttle and closing of the excitation circuit, the drive shaft 12 begins to rotate and the vehicle, representative of the load, begins to move. As it moves and is accelerated, a voltage begins to be emitted by the small generator 100 or 100'. When this voltage reaches a predetermined value, say, illustratively, at a car speed of 10 M. P. H., the pilot relay is actuated by this developing dynamic force against the spring bias force and the roller 120 moves far enough to release the contact-making engagement of switch 121 of the pilot relay, breaking the connection to the downshifting solenoid 180 of the stepping-selector position changer. As the speed of the load picks up and increases with acceleration of the motor, the value of the output of the small generator 100 or 100' increases until the energization of the electromagnet pilot relay has developed such dynamic force on the armature as to so far overcome the spring bias on the armature, that the switch 122 is actuated by roller 120, closing a circuit through the upshifting solenoid 165, which immediately gives the cam ratchet a single kick, or step, by tooth 152, advancing the shaft 20 one notch. In the drawings the upshifting movement of the shaft 20 is counterclockwise and downshifting is clockwise. This ratchet actuation immediately changes the shaft setting and progresses it to setting "2," and moving the associated switches. This directly, or in Fig. 2 indirectly by reason of the relays, removes the generator parts output lead connections x, y and z from the eight pole connections of the motor parts of the transmission to the illustrative four pole connections. This effects a change in the transmission ratio, by cutting the delivered torque in half while doubling the speed of the driven shaft 12. In this second "gear" the transmission also functions as a torque converter as in low or 1st "gear." The word "gear" as used herein is for simplicity by analogy with conventional automotive transmissions of changeable ratio, although, as will be obvious, in the instant invention there are no "gears." Movement of the switch parts in snapping from position "1" to "2," through switch A short circuits motor leads L1, L2, and L3, and through switch F cuts resistor section 112 into small generator phase output w and immediately reduces the dynamic force on the armature of the pilot relay, and this permits the spring 117 to move roller 120 counterclockwise, breaking the circuit through solenoid coil 165, which permits spring 173 to retract the plunger 167 and thus retract and reset pawl 172 for a succeeding stroke.

It may be mentioned at this point that in all upswitching and downswitching steps, the circuit through the solenoid is almost immediately interrupted after a step is concluded, so that the adverse effects of a prolonged circuit through a solenoid coil are obviated.

As the car speed increases in second "gear," the R. P. M. of the small generator increases, and the increased voltage and current again begin to develop dynamic force adequate to overcome the bias of the spring 117 and to move the roller 120 toward switch 122. Let it be assumed that at an illustrative 18 M. P. H. of car speed, roller 120 forces switch 122 to snap "on." The same functioning happens as has been described of the situation at position "1," the solenoid 165 is given another D. C. surge of sufficient duration as to actuate the stepping solenoid control to advance the next upswitching tooth 153 and thus the shaft 20 to position "3." This effects in the selector switches the proper interconnections to place the generator output leads x, y and z in series with resistors 75, 76 and 77. The switch finger 215 moves to engage contact 222 of auxiliary switch F, thus placing the series resistances of sections 112 and 113 in phase output line w from the small generator 100, which immediately decreases the voltage in the field of the pilot relay 103, and the roller 120 is immediately withdrawn from holding switch 122 closed, and floats between the switches. The breaking of the current flow through the solenoid coil 165 permits the spring 173 to retract the core and the pawl device 172 is ready for the next selector progressing actuation, in progressing from "3" to "H." The counterclockwise movement of the roller 120 stops short of the increment necessary to re-actuate downswitching switch 121.

Finally, assume that with continued acceleration of the vehicle the increased voltage from the small generator 100 or 100' is ultimately adequate to overcome the joint resistances of sections 112 and 113 of resistor 111, and the pilot relay is exposed to dynamic force adequate to overcome the spring 117 and to cause the roller 120 again to engage and to close upswitching switch 122. The vehicle speed at this point, for illustration, may be assumed to be 25 M. P. H. As will be evident, the current circuit is closed through solenoid 165, and the selector is given a further step in progression by engagement of tooth 154 by pawl 172, moving shaft 20 to "H" and moving all of the switches to the ultimate positioning permitted by shaft 20. As will be clear, the contact finger 215 of switch F engages contact 223, cutting in the final additional resistance section 114 of resistor 111 into the phase output line w from the small generator. This reduced effective torque on the armature of the pilot relay permits same to float off switch 122, opening same, and approaching, without reaching, or at least without actuating, switch 121. It will be seen that with the selector controller in position "H" neither "on" or "off" motions of switch 122 can have any further effect on the controller, because even if actuated the pawl 172 would simply strike the rounded surface 151 of the cam ratchet, without moving the ratchet device and shaft angularly, and additionally the circuit through solenoid coil 165 has been broken by the movement of the switch arm 200, beyond the last contact 211 on the ring 204 of switch E.

The vehicle is now in the 4th or highest "gear" in the normal substantially 1:1 drive, and although further increase in car speed increases the voltage output from small generator 100 or 100' and this may be adequate to overcome the resistances of all sections 112, 113 and 114 of the resistor 111, movement of the armature in response thereto, even to the closing of switch 122, has no further effect on the stepping device of the selector organization, as has been discussed. With variations in the fairly high speed of the vehicle, the roller 120 may float between closing and opening switch 122, without any effect on the transmission.

In downswitching, let it be assumed that the car speed drops to or just below the illustrative 25 M. P. H. at which the last upswitching action took place, with a consequent reduction in signal output from the small generator. This so reduces the torque on the armature that the spring 117 is able to force the armature counter-clockwise to such degree that the roller 120 engages and closes switch 121. This closes a circuit from the battery 9 through lead 126, contact 125 of switch 121, lead 128 through downswitching solenoid coil 180, lead 109, contact 207, switch arm 201 (then in engagement with contact 207), through wiping arm 212, and connector 143 to the other pole of the battery 9.

The current through the solenoid 180 pulls in the core piece 181, and causes pawl 185 to engage tooth 155 of the cam ratchet 150, to move the shaft 20 one step in a clockwise direction, back to position "3." The switch arm 215 of switch F moves from contact 223 to contact 222, thus cutting out the upper section 114 of the resistor 111 in signal generator lead w. This causes the current in the pilot relay coils 105 to raise sufficiently as to pull the roller 120 away from switch 121, to break the circuit through the solenoid 180, and the roller thereafter floats between the switches 121 and 122 of the pilot relay. As soon as the solenoid-actuating circuit is broken, the spring 186 retracts the plunger core 181 and re-sets the pawl 185 for a succeeding stroke. The selector switches have removed the short circuiting connections for the transmission generator outputs x, y and z, and have placed them respectively in circuit with resistors 75, 76, and 77, and the vehicle is in 3rd "gear."

With further decrease of the car speed there is, of course, consequent reduction of the signal voltage from the small generator. It may be assumed that when, in deceleration of the vehicle, its speed reaches or passes just below 18 M. P. H. the small generator output has so decreased that the spring 117 is able to force the armature and thus the roller 120 counterclockwise far enough to again close switch 121. This action closes a battery current circuit through the solenoid 180, which gives the pawl 185 a downward movement against tooth 156 on cam ratchet 150, retracting the shaft 20 in clockwise motion, one step. The movement of switch F cuts out section 113 of the resistor 111, thus raising the value of the signal current in the pilot relay and opens switch 121, by movement of the roller 120 out of switch-closing contact therewith. The selector switches disconnect the transmission-generator output leads x, y and z from the resistors 75, 76, and 77, and connect them to the four pole motor organization leads L4, L5, and L6, and the vehicle is in 2nd "gear."

As before, with other stages of the transmission ratio changes, the roller 120 floats between the switches 121 and 122. Finally, with continued reduction in speed, to or just below 10 M. P. H. the output signal voltage from the small generator has decreased to a value at which the dynamic force on the armature is less than the force from the spring 117, and the roller 120 is forced against and closed downswitching switch 121. This again energizes the solenoid 180 and actuates the pawl 185 against tooth 157, and the final downswitch stepped-clockwise progression of the shaft 20 is accomplished. Switch F is actuated to cut out the first resistance section 112 of resistor 111, switch E is actuated to place switch finger 201 on a blind or blank space on ring 204, thus preventing completion of any circuit through downswitch solenoid 180, and the main switches are actuated to remove the transmission generator output leads x, y and z from the four pole motor leads L4, L5, and L6, and connects them to the eight pole motor leads L1, L2 and L3. The increase in the value of the signal voltage due to removal of the resistance section 112 increases the counterclockwise torque on the armature of the pilot relay to a point at which the roller 120 moves from switch 121, and floats between the switches 121 and 122, until, with final stoppage of the vehicle, the generator signal reduces to zero and the spring 117 forces the roller 120 to close switch 121, where it remains until moved by beginning and increasing signal from the generator with re-starting and acceleration of the vehicle in a forward sense.

It will be clear that any reduction of speed adequate to cause a downswitching of less than the full number of steps, if followed by suitable increase of speed, will effect an upswitching without completion of all downswitching steps, and vice versa.

In the foregoing it has been assumed that both the upswitching steps and the downswitching steps occurred respectively substantially at 10 M. P. H., 18 M. P. H. and 25 M. P. H., for purely illustrative example, and being dependent upon the sense of approach to the respective speeds for determining whether the selector is moved clockwise or counterclockwise, i. e. whether downswitching or upswitching. It is pointed out that these speed points are controllable and variable by regulation of the pre-loading of spring 117.

The upswitching set to occur at the illustrative 10 M. P. H., 18 M. P. M. and 25 M. P. H. are true for certain more or less constant throttle conditions of the motor, maintained during the whole process of upswitching. However, an important feature of the invention to be explained effects much more flexible control by the operator, whereby the actual points at which upswitching occurs may vary by changes in throttle opening between stages or points of upswitching.

It has been noted that the phase lead u from small generator passes through choke coil 110 on its way to input lead 106 of pilot relay field 105, and that the iron core 144 of the choke coil is coupled to the foot throttle 140, whereby the core is progressively moved into the coil as the throttle is opened with depression of the foot pedal throttle control 140. As the current from the small generator 100 is A. C., inserting the core 144 into the coil 110 will have a choke effect on the A. C. effective in the field 105 of the pilot relay, with a proportionate reduction in torque on the armature of the pilot relay. In other words, the sensitivity of the pilot relay is a maximum when the throttle is released substantially to idling, and is a minimum when the throttle lever is fully depressed with the throttle wide open.

Let it be assumed that the switching points or speeds previously discussed as being at 10 M. P. H., 18 M. P. H. and 25 M. P. H. respectively, are attained at the same throttle opening, say, for example, one third open, and with the vehicle functioning on a good and level road, that it takes say, 30 seconds to make all of the upswitching steps from "1" to "H." With this assumption, of course, the iron core 144 would be approximately one third of the way into coil 110. On the other hand, with the vehicle on the same good and level road, and the throttle, say, one quarter open, and with the iron core consequently approximately one quarter way into the coil 110, so that the choke effect is somewhat less than the cited one third insertion, the upshifting steps may take place at 8 M. P. H., 16 M. P. H. and 23 M. P. H. respectively, while the time required to shift from "1" to "H" may be as long as 35 seconds. Further, however, with the throttle, say, one half open, and with the core 114 approximately one half way into the coil 110, with enhanced choke effect, the complete range of upshifting may take place at 12 M. P. H., 20 M. P. H. and 27 M. P. H., with a reduction of the total elapsed time to, say, 25 seconds. With the throttle three quarters of the way open, with corresponding positioning of the iron core in the choke coil, the upshifting may occur at, say, 14 M. P. H., 22 M. P. H. and 29 M. P. H., and the elapsed time from dead stop to high "gear" may be of the order of 20 seconds. Finally, starting with wide open throttle and complete choke effect of the core in the coil, the upshifting may occur at speeds of 16 M. P. H., 24 M. P. H. and 31 M. P. H., but the time consumed in completing the range may be of the order of 15 seconds.

The foregoing arbitrary figures are, of course, entirely speculative, and assume a given size of motor, vehicle, choke coil and iron core, and a given loading or tension of the spring 117 of the pilot relay. It will be seen that by suitable selection of the motor or engine and the transmission, the points of speed at which the upshifting occurs for various degrees of throttle opening can be selected within reasonably wide limits by simply using the right size of choke coil 110 and the right size and shape of the iron core 144 therefor.

It will be seen that the above assumptions will be subject to variations, with variations in the throttle manipulations, load and road conditions, and the transmission is actuated in changes of ratio according with such variations, as indicated by the following generalizations.

Assume the vehicle is started from a dead stop on the good level road with the trottle open, say, one third, and permitted to just complete the second upshift to third "gear," with selector position "3," when the throttle is suddenly fully depressed. The speed of the vehicle at this instant is, say, the illustrative 18 M. P. H. previously mentioned. But with the wide open throttle, the speed of the vehicle is too low for the engine to develop its full power, as will appear from the recited conditions for fully open throttle above, at which the vehicle speed should be 24 M. P. H. Therefore, in order to prevent the motor from laboring, it will be seen that the transmission should be in a lower "gear," say, in 2d, or selector position "2." This is immediately automatically accomplished by the system described. The full opening of the throttle inserts the core 144 fully into the choke coil 110, causing a lowering of the value of the current flowing in the pilot relay field, decreasing the dynamic force operative on the armature. The spring 117 forces the armature counter-clockwise and the roller 120 closes switch 121. This causes a downswitching actuation of the downshifting pawl 185, and the selector moves one step and by the switches effects the connections establishing the 2d "gear" ratio of the transmission. Similar downswitching takes place under similar conditions should the transmission be in high or second "gear," any time an appreciably large and sudden change is made in the throttle opening. Small and gradual changes in throttle opening should and do not cause such shifting.

It will be seen, therefore, that with the vehicle proceeding in high "gear" at a fairly moderate speed, and it is desired to effect a sudden acceleration of the vehicle, a sudden quick thrust of the foot throttle to fully open attitude, causes a downswitch stroke, throwing the transmission into 3d "gear," and a quick acceleration begins which is completed in high "gear." However, it will also be seen that with the vehicle traveling at high speed, with a fairly widely opened throttle, the sudden complete opening of the throttle has no effect on the transmission, as the small additional amount of iron core introduced into the choke coil 110 by this procedure is not sufficient to cause sufficient drop in current in the field 105 of the pilot relay as to cause the roller to engage and close switch 121, and no downshifting occurs. The normal torque of the motor at high speed is fully adequate to take care of further acceleration when the vehicle already has high speed, and therefore no downshifting is necessary or desired.

For a further example, let it be assumed that the vehicle is a heavily loaded truck, in high "gear," (the "H" selector position), when it encounters a steep upgrade. The operator, in order to maintain his speed naturally opens the throttle to the limit. Owing to the adverse conditions, the motor is unable to maintain the speed in the then existent ratio of the transmission and the vehicle begins to slow down. As the core has been fully inserted into the choke coil and the sensitivity of the pilot relay has been lowered to its minimum, the spring 117 of the relay is soon able to overcome the decreasing dynamic force of the decreasing signal from the small generator and the roller 120 closes switch 121 and downswitching occurs. If the truck continues to slow down, the system will continue to effect downswitching automatically in the same manner, and if the upgrade is sufficiently steep will switch the transmission all the way down to selector position "1." If the upgrade is not quite so abrupt and the operator does not advance the throttle toward open from his moderate speed attained at the bottom of the upgrade, so that the truck slows down, downswitching will automatically occur, but at lower speeds in M. P. H. This is for the reason that as the core is only partially extended into the choke coil, the sensitivity of the pilot relay has not been materially changed from its maximum and therefore has more torque than when the core is fully extended into the choke coil.

It will be seen, therefore, that the choke coil and iron core arrangement works in the proper manner in both downswitching and in upswitching, and is especially suitable for the characteristics of gas or diesel engines. As this automatic actuation is a function of the sensitivity of the pilot relay, it will be obvious that this can be accomplished in other ways. For instance, the foot throttle can be used for shunting a variable resistor across the coils of the pilot relay and using D. C. current (not shown).

Reversing the transmission is done manually by moving knob 22 and shaft 20 clockwisely. As noted, this interchanges the transmission generator leads $x$ and $y$ between switches B and C and to the eight pole motor leads L2 and L3. This can occasion no automatic actuation of the selector mechanism, as both pawls are aligned with rounded portions of the cam ratchet and cannot actuate same even if moved. Moreover, the positioning of the shaft 20 in its extreme clockwise positioning interrupts the circuits through both switches 121 and 122 of the pilot relay.

It will be observed that opening the manual switch 126' in line 126 from the battery opens all battery circuits except excitation of the generator motor, and permits completely manual operation of the knob 22 and shaft 20, and therefore of all of the transmission ratios available from the system.

It is pointed out that at any time that the vehicle is in motion, release of the foot throttle opens the switch 141, breaking the excitation current flow through the winding 17, and the vehicle is in free-wheeling.

An important feature of the invention lies in the fact that the transmission is susceptible to dynamic braking. When the car is in motion and the foot throttle is released slowly so that the engine speed drops below the speed of the vehicle, a dynamic brake effect reacting against the motor is achieved, which is a maximum just before the movement of the throttle lever 140 opens the switch 141 controlling the excitation current to the exciting winding 17 of the rotor 16 in the transmission. A more pronounced dynamic braking is available from the system, with the car in motion. This involves the release of the throttle and the setting of the selector to reverse. Pushing the throttle inwardly and closing switch 141 to the exciting winding of the generator part of the transmission effects a violent form of dynamic braking, as the power of the motor is applied in reverse against the forwardly moving vehicle. Obviously great care must be exercised in utilizing this braking, which should be reserved for emergency retardation or stopping only.

It will be apparent that many modifications may be resorted to without departing from the spirit of the invention. One exemplification thereof is shown in Fig. 2. As will be seen, although the auxiliary switches and their connections are substantially maintained in Fig. 2 with the same functions as in Fig. 1, all of the main switches A, B, C, and D are replaced by a single switch g, which is a small switch used for selection of the battery circuits for the magnetic main contacts or relays carrying the main currents for the transmission shown, generically designated by housing 10. The main contactors or relays to be described are all of commercially available types and sizes. The actuating coils thereof are connected into the battery circuit by switch g according to the setting of the selector shaft 20, indicated by the position of knob and pointer 22 relative to the graduations or indicia on the dial 21. When the respective relay coils are energized by the setting of switch g, connection is made to the normally "off" contacts, and when the current to the coil is off and the coil is de-energized, the contactors drop out by spring action, making connection with the normally "on" contacts.

In Figure 2 the transmission is the same as that of Fig. 1, and bears the same reference characters. The solenoid stepping-shaft actuator is the same and bears the same reference characters, the shaft 20 is similar, and has the same angular settings and knob pointer and indicia, and has the same reference characters. Auxiliary switches E and F are the same and bear the same reference characters, and finally, pilot relay 104 has the same control switches, and actuating arm and roller, and bears the same reference characters as in Fig. 1.

The primary difference between the two systems lies in the fact that in Fig. 1 all of the transmission A. C. currents are carried by the main switches A, B, C and D, and the D. C. currents are controlled by auxiliary switches E and F, all controlled by the angular setting of the shaft 20. In Fig. 2 these shaft-controlled A. C. switches are controlled by a single selector switch of small current capacity, as the separate main contactors or relays carry the main A. C. loads. This facilitates the mounting of the device on the steering column of a vehicle, for instance. For purposes of control of the transmission, according to Fig. 2, five main contactors or relays are provided. Each relay comprises an actuating coil, an armature, and switch elements controlled between first and second, or normally "on" or made, and broken or "off" contacts. In Fig. 2, as noted, the same auxiliary switches F and E are used, working with the respective components of the system substantially the same as in Fig. 1. The relays are respectively designated as "a," "b," "c," "d," and "e." "a" is a reversing relay for reversing transmission generator outputs x and y, and also, when energized for reversing, for holding in relay b in its eight pole connections with outputs x, y, and z. "b" is the low "gear" and 2d "gear" relay, actuated in position "1" of the selector, and also by relay "a" when energized to close normally "off" contacts establishing connections from the transmission generator leads x, y and z to the eight pole motor connections L1, L2 and L3, and when deenergized automatically coupling generator leads x, y and z to the four pole motor connections L4, L5 and L6 in 2d "gear." "c" is a compound relay which, when "off" completes the path for generator leads x, y and z to the four pole motor connections in relay "b" and when energized, (3d gear functioning) switches leads x, y and z into circuit with resistances 75, 76 and 77 respectively. Relay "d" when energized, (2d gear functioning) short circuits the motor leads L1, L2 and L3. Finally, relay "e" when energized, short circuits transmission generator leads x, y and z (high gear functioning). While the energization of the respective relays is controlled by switch g (and by other relays, as will be pointed out), all of the relay coils have a common return line 318.

Referring to Fig. 2, reversing relay a is provided, having a switch arm 240 normally engaging "on" contact 241, connected to a common line 242, including a normally "off" contact 238. It also includes a switch arm 237 normally engaging "on" contact 245. Actuation of coil 239 (by switch g, to be described) pulls the armature 236 against the bias of a spring 235, moving both switch arms 237 and 240 from engagement with contacts 245 and 241 respectively, into engagement with contacts 238 and 245 respectively. Coil 239, when energized, pulls in switch 243, closing an energizing circuit through the coil of relay b.

Relay b has an actuating coil 261 (energized by switch g to be described), moving an armature 265 when actuated, against the bias of spring 266, and controlling the position of three switch arms, respectively, 262, 263, and 264. Switch arm 264 is movable between normally made contact 275, connected to L6, and normally off contact 274, connected to L3. Switch arm 263 is movable between normally made contact 273 connected to L5 and normally off contact 272 connected to L2. Switch arm 262 is movable between normally made contact 271 connected to L4 and normally off contact 270 connected to L1.

Relay c has a coil 291 energized by switch g, to be described, which pulls armature 302 against the bias of springs 303, and controls the settings of switch arms, as follows: arm 292, movable between normally made contact 294 connected to switch arm 262 of switch b, and normally off contact 293 connected to resistance 75, arm 295, movable bettween normally made contact 297 connected to switch arm 263 of switch b, and normally off contact 296 connected to resistance 76, and arm 298, movable between normally made contact 301 connected to switch arm 264 of switch b, and normally off contact 300 connected to resistance 77.

Relay d has a coil 281 (also energized by switch g, to be described), which actuates an armature 276 against the bias of spring 285, and controls the position of switch arms 282, between a normally "on" blind contact and a normally unmade contact 286, arm 283, between a normally "on" blind contact and a normally unmade contact 287, and arm 284, between a normally "on" blind contact and a normally unmade contact 288. The normally unmade contacts 286, 287 and 288 are joined together in a shorting connection.

Relay e has coil 311 (energized by switch g, to be described) which controls the armature 315, against the bias of spring 277, controlling the position of switches 312, 313 and 314, between normally "on" blind contacts, and normally "off," short circuiting contacts joined by a connection 279.

To the end of utilizing the relays recited, a single main switch g is associated with the shaft 20 (in addition to the auxiliary switches E and F previously described). This comprises a movable switch element on shaft 30, insulated therefrom, having a single contact-making arm 330 and a wiping sector 331, constantly engaged and wiped by an arm 332, joined with a connector 333 leading across one end of a switch 334 to common switch lead 126 of pilot relay 104.

As has been noted, this lead 126 connects to the respective movable elements 123 and 124 of the respective switches 121 and 122 of the pilot relay. On the insulating disc 335 of switch g there are five active contacts. Contact 336, used for reversing only, through lead 337 goes to the coil of reversing relay a, and is only contacted by the arm 330 in the manual setting of the shaft 20 by knob 22 to setting "R." In Fig. 2, as noted, all of the coils for the respective relays a to e have a common return line 318 to one side of battery 9, and individually to the respective coils through switch 334 to the wiping arm 332 to the other respective contacts and the switch arm 330 of switch g to the other side of battery 9.

Switch g has a contact 339 leading to one side of coil 261 of relay b, in setting "1" of shaft 20. It has a contact 340 leading to one side of the coil 281 of the relay d, energized only when the shaft 20 is moved to position "2." For engagement when the shaft is moved to position "3," a contact 341 is provided on the ring of switch g, for engagement by the switch arm or finger 330, and leads to the coil 291 of relay c. Finally, a contact 342 is provided for engagement by switch arm 330 in the "H" setting of the shaft 20, which is connected to the coil 311 of the relay e. It will be seen, therefore, that although at "N" or neutral the switch arm 330 rests on a blank or inert area on ring 335 of switch g and closes no contact, at position "1" or low, it energizes and actuates relay b, in position "2" it energizes and actuates relay d, at position "3" it energizes and actuates relay c, and at position "H" or 4th, it energizes and actuates relay e.

The pilot relay 104 of Fig. 2, generally interchangeable with the pilot relay 103 of Fig. 1, has the same shaft 116, arm 118 and roller 120 as in Fig. 1, and the switches 121 and 122 are the same. However, the armature in this illustrative case comprises a general S-shaped armature having two oppositely presenting free armature ends or legs 350 and 351, biased by a spring 352 (analogous to spring 117 of Fig. 1) toward an anticlockwise limit (not shown). The armature legs are movable relative to a pair of hollow coils, respectively 353 and 354, in series connection, having input leads respectively 355 and 356. As in the pilot relay 103 the position of the armature, and thus of the arm and roller with relation to the switches, is a function of balance between the bias of the spring 352 and that of the dynamic force incident to magnetic attraction between the coils and the armature legs or ends. The load speed signal in this case is illustratively represented by a small single phase generator 100', driven by the output or driven shaft 12 of the transmission 10, having output leads s and t. Lead s from the small generator 100' is connected to the lead 355 of the coils of the pilot relay. Lead 356 of the series connected coils 354 and 353 connects to the wiping element 217 of switch F, and through the respective contacts 221, 222 and 223, 224 connects through the respective sections of the resistor 111, to the output lead t of the small generator. The foot throttle 140 controls switch 141 in a line with manual switch 142 to the battery, for controlling the excitation of the rotor winding 17 of rotor 16 of the transmission, and a carbonpile device 360 is controlled by the foot throttle, for modifying the voltage output of the small generator 100'.

It will be seen from the diagram of Fig. 2 that the normal condition of the organization with the vehicle at a standstill, but with the motor idling and driving the rotor 16 of the generator parts of the transmission, with the selector shaft 20 in its position "1," finds the excitation current cut off, so that no current flows in the transmission, and the pilot relay is in its static rest condition, as there is no signal voltage from the then stationary generator 100', the relay b is "on" or "made" so that the low "gear" of the position "1" of the selector finds the generator output leads x, y and z coupled with the eight pole motor organization leads L1, L2 and L3 of the transmission, and the movable finger 330 of switch g is on contact 339 leading to coil 261 of relay b. Wiping contact finger 332 of switch g connects by lead 333 and switch 334 with one pole of battery 9, and to common connection 126 of the switches 121 and 122 of pilot relay 104. In the static rest position of the latter, the switch 121 is closed, completing a circuit through lead 128 to stepping solenoid coil 180, and through lead 109 therefrom to contact 205 of switch E, at which point the circuit is broken as the switch arm or finger 201 at position "1" is spaced from this contact and rests on a blank or blind area of the ring 204, as shown.

Advancing the throttle by depression of foot lever 140, as in the other form of the invention, closes switch 141, placing exciting D. C. current from the battery on the winding 17 of rotor 16 of the transmission, and energizing the transmission in the highest ratio or first "gear," and the vehicle starts to move. Movement starts generator 100' which emits a voltage, which in this illustrative case is single phase A. C., the current lead s connects with pilot relay coils 354 and 353 through lead 355, and with one end of the carbonpile regulator 360. The other lead 356 for the coils of the pilot relay, goes to the wiping arm 217 of switch F, and according to the position of the movable finger 215 thereof relative to the respective contacts of this switch, connects in the various sections of resistor 111, and in position "1" includes no sections thereof. The circuit is completed across the regulator 360 and by a common line 361 from the regulator and from small generator lead t to the resistor 111.

When the voltage from the signal generator 100' attains a value adequate to establish a dynamic force on the armature of the pilot relay, overcoming the bias of the spring 352, the roller 120 moves away from and opens switch 121, and eventually closes switch 122. This places an upswitching current on solenoid 165 and advances the selector 20 counterclockwise one step, as should be clear. This breaks the circuit through coil 261 of relay b, which snaps off, connecting the transmission generator leads x, y and z in circuit with the four pole motor organization leads L4, L5, and L6. Synchronously, the advancing finger 330 of selector switch g, in leaving contact 339, engages contact 340, closing a circuit through coil 281 of relay d, shorting out the open motor leads L1, L2 and L3. Synchronously switch F has cut in section 112 of resistor 111 into the pilot relay coil circuit.

Further acceleration of the vehicle in 2d "gear" finally generates a voltage of such value that roller 120 again closes switch 122 and another stepped advance of the selector shaft is accomplished. This step into 3d "gear" breaks the circuit through coil 281 of relay d releasing the leads L1, L2, and L3 from their shorted out connection, and makes the circuit through relay coil 291 of relay c, which snaps on and connects the generator leads x, y and z with the respective resistances 75, 76 and 77, and switch F cuts in the next section, 113, of the resistance 111 into the circuit through the pilot relay. The reduction in dynamic force on the armature of the pilot relay thus effected again causes the roller 120 to leave switch 122 and to float between 121 and 122.

Finally the increasing signal from the small generator 100' is able to force the pilot relay roller 120 against and to again close switch 122. The final upswitching then takes place and in moving from "3" to "H" the relay circuit, through coil 291 of relay c, is broken, and the relay c snaps open, removing the resistances from the generator leads of the transmission. Synchronously the coil 311 of relay e snaps on, effecting the final step of short circuiting the generator output leads x, y and z.

As the main relays or contactors are energized by battery current, opening the switch 126' permits manual actuation of the selector shaft.

As noted, the generator 100 can be used in place of generator 100' in Fig. 2, or in either figure, if desired, a small D. C. generator can be used as the signalling device, although the A. C. generator is presently preferred as it does not seem to have the lag of the D. C. current on the pilot relay. This lag in the pilot relay 104 in response to D. C. voltage is probably due to hysteresis in the iron used in the armature, and in part can be ascribed to the absence of the small vibrations attaching to the use of A. C. voltage.

While in Fig. 2 a carbonpile regulator is disclosed connected across the generator leads s and t, it may also be used in line or series with one of the generator leads, or it may be substituted by a conventional variable resistor operated by the foot throttle in the same manner as shown with the carbonpile regulator. These controlling or regulating devices are useable with both A. C. and D. C. signals, and perform the same function as the choke coil 110 of Fig. 1, and may be substituted therefor. Conversely, the choke coil arrangement shown in Fig. 1 may also be used in Fig. 2, although in this case it is operable only with A. C. signals from the small generator. Of course, any form of resistor including choke coils and the like are contemplated for resistor 111.

It may be noted that the particular form of transmission shown herein has asynchronous characteristics, but there are various forms of analogous transmission systems which are synchronous, as well as other types of both electrical and mechanical torque converters which may be used with the instant invention. It will, of course, also be evident that the invention is not limited to the number of speed and torque steps shown, and elimination of some or the addition of others are contemplated herein.

Finally, it will be seen that the controlling system of this invention is not necessarily limited to a dynamoelectric transmission as disclosed, but is available for useful control functions with mechanical transmissions utilizing, for instance, fluid couplings in part of the transmission. For instance, there are many hydraulically and mechanically operated drives or transmissions on present automotive vehicles, presently requiring complicated hydraulic shift-initiating parts, such as governors, metering and spring loaded valves, and pressure-actuated cylinders used to actuate brake bands and clutches. With the present invention, all of these control and actuating parts, hydraulic lines, etc., are removed, leaving nothing but the basic torque and speed transmitting parts. For the removed pressure-actuated cylinders there is substituted electromagnetic actuating means connected into the apparatus of Figs. 1 or 2, with elimination of the disclosed dynamoelectric transmission. The electromagnetic actuating means could be coupled directly into the circuits controlled by switch *g* of Fig. 2, for instance, with elimination of the main relays or contactors *a*, *b*, *c*, *d*, and *e*, as the currents necessary for actuation may be fairly light. Such utilization of the control system is within contemplation herein.

Having thus described my invention, I claim:

1. A transmission having a plurality of ratios having an input shaft for driven connection to a power plant and an output shaft for driving connection to a load, a positionable selector device, circuit controllers operative as functions of selector positioning, electrical means for moving the selector device, a pilot relay responsive to an electrical signal and having plural positions including at least one between no signal and maximum signal, switch means operatively associated with said pilot relay and selectively energized according to the position of said relay, said switch means controlling said electrical means, means emitting an electrical signal functional with the speed of said load, said pilot relay responsive to said signal and operating said switch means when said signal has a predetermined value to change the selector position to change the ratio of said transmission.

2. In transmission lines between a power plant and a load susceptible to acceleration, a transmission of variable ratio, a generator driven functionally with speed of such load to generate a signal, pilot relay means positionable by balance between a mechanical force and a variable dynamic force functional with such signal through a range of positions, and switch means operative by said pilot relay under predetermined relations of said forces and selected positions of said relay, and means controlled by said switch means for shifting the ratio of said transmission.

3. A transmission ratio-changing system comprising a transmission having plural ratios of input to output, a selector device, a switching device controlling the selector device, signal means for emitting a signal proportional to the speed of the output of the transmission, means in the switching device for controlling the selector device as a function of the strength of said signal, means in the selector device for changing the ratio of said transmission when the signal strength has a predetermined value, and means responsive to actuation of the selector device for a change of ratio for predeterminedly varying the strength of said signal to a value such that substantially predetermined changes in speed of the output of said transmission are required to attain a signal strength adequate to actuate said switching device for another ratio change.

4. In transmission systems, a transmission having a plurality of ratios of input to output, a selector device, electromagnetic means for positioning said selector device in steps, a pilot relay including switches controlling circuits through the electromagnetic means, a generator, means for driving said generator at a rate functional with the output speed of said transmission to generate a signal, said pilot relay including switch-actuating means actuated with unbalance between a mechanical force and a dynamic force functional with said signal, and means responsive to a stepped positioning of said selector device for changing the instant ratio of said transmission to another ratio.

5. In transmission systems, transmission means of variable ratios of input to output, signal means furnishing a signal proportional to the speed of output of said transmission, means responsive to the strength of said signal for effecting a change of ratio of the transmission means as a function of a predetermined output speed of said transmission means, and means for modifying said signal to effect a change of ratio of said transmission means at a different predetermined output speed thereof.

6. In transmission systems, transmission means of a plurality of different ratios of input to output, a generator emitting a signal functional with the output speed of said transmission means, an electromagnetic pilot relay having an armature, means biasing the armature in one sense with a force opposing a dynamic force resulting from incidence of said signal on said relay, switch means operatively associated with and actuated according to the positioning of said armature, movable selector means including electromagnetic actuating means controlled by said switch means, ratio means including circuit controllers operable as functions of the position of said selector means for effecting respectively different ratios of input to output of said transmission means.

7. In transmission systems, transmission means of a plurality of different ratios of input to output, a generator emitting a signal functional with the output speed of said transmission means, an electromagnetic pilot relay having an armature, means biasing the armature in one sense with a force opposing a dynamic force resulting from incidence of said signal on said relay, switch means operatively associated with and actuated according to the positioning of said armature, movable selector means including electromagnetic actuating means controlled by said switch means, ratio means including circuit controllers operable as functions of the position of said selector means for effecting respectively different ratios of input to output of said transmission means, said ratio means including circuit controllers to said signal to modify the effectiveness of said signal on said pilot relay.

8. In transmission systems, transmission means of a plurality of different ratios of input to output, a generator emitting a signal functional with the output speed of said transmission means, an electromagnetic pilot relay having an armature, means biasing the armature in one sense with a force opposing a dynamic force resulting from incidence of said signal on said relay, switch means operatively associated with and actuated according to the positioning of said armature, movable selector means including electromagnetic actuating means controlled by said switch means, ratio means including circut controllers operable as functions of the position of said selector means for effecting respectively different ratios of input to output of said transmission means, said ratio means including circuit controllers for progressively adding or subtracting effective resistance to said signal to modify the effectiveness of said signal on said pilot relay, and supplemental means for further modifying the effectiveness of said signal.

9. Transmission systems as recited in claim 8, in which the supplemental means comprises a variable resistance.

10. Transmission systems as recited in claim 8, in which the supplemental means comprises a carbonpile regulator.

11. Transmission systems as recited in claim 8, in which the supplemental means comprises a choke coil.

12. A transmission comprising a dynamoelectric unit having an input shaft for coupling to a prime mover and an output shaft for coupling to a load, means in the unit developing currents in response to relative rotations of the input and output shafts, means for directing the load currents in the unit for changing the ratio of input to output between the respective shafts, and means responsive to the rotational speed of the output shaft in the same sense of transmission for actuating said last means.

13. A transmission having an input shaft for coupling to a prime mover and an output shaft for coupling to a load, said transmission comprising a generator having rotatable rotor and armature members, one of which is driven by the input shaft and the other of which is in coupled relation to the output shaft and comprising a transmission unit having a polyphase output, a motor comprising a transmission unit formed of field and armature members, one of which is mounted for rotation with the generator member coupled to the output shaft, and an electrical system comprising a pilot relay mounting switches, a plurality of main contactors for selectively directing currents from said generator unit in the transmission to secure predetermined ratios of transmission between the input and output shafts, and means for actuating the main contactors in response to selected actuation of the pilot relay switches, means for impressing a signal on the pilot relay proportional to the speed of the output shaft on the pilot relay proportional to the speed of the output shaft of the transmission, said pilot relay having means for actuating its switches selectively with predetermined values of the signal.

14. A control system for a dynamoelectric transmission having internal currents comprising a plurality of main contactors operative to direct the internal currents in the transmission to secure changes of transmission ratio in the same transmission direction, a pilot relay operative to selectively actuate and control the main contactors, and a generator having an output proportional to the speed of the output of said transmission feeding said pilot relay to effect operation thereof to selectively control said main contactors.

15. A transmission system comprising a transmission organization having an input shaft for coupling to a power source and an output shaft for coupling to a load, said organization comprising a generator and a motor, said generator comprising rotor and armature generator members of which one is rotatable with the input shaft and the other is rotatable with the output shaft and of itself functioning as a slip clutch between the respective shafts, said organization further including a motor formed of field and armature members, one of which is mounted to rotate with that generator member rotatable with the output shaft, the field member of said motor having poles to receive the output of said generator to effect a torque converter transmission between input and output shafts, and means operative to connect and disconnect the generator output to and from the motor windings and for substantially short circuiting same in alternation in effecting transmission ratios of the transmission functioning as a slip clutch or as a torque converter, and means for actuating the operative means functionally with changes in speed of said output shaft of said transmission organization.

References Cited in the file of this patent

UNITED STATES PATENTS

| | | |
|---|---|---|
| 1,903,231 | Colman et al. | Mar. 28, 1933 |
| 1,990,566 | Ramsden | Feb. 12, 1935 |
| 2,193,214 | Winther et al. | Mar. 12, 1940 |
| 2,223,210 | Hefel | Nov. 26, 1940 |
| 2,258,005 | Durdin Jr. | Oct. 7, 1941 |
| 2,441,605 | Trofimov | May 18, 1948 |
| 2,465,006 | Bowes et al. | Mar. 22, 1949 |
| 2,503,916 | McIver | Apr. 11, 1950 |
| 2,666,492 | Nims et al. | Jan. 19, 1954 |

FOREIGN PATENTS

| | | |
|---|---|---|
| 26,574 | Great Britain | of 1909 |
| 341,201 | Great Britain | Jan. 15, 1931 |